United States Patent
Moreau-Gobard et al.

(10) Patent No.: US 7,233,330 B2
(45) Date of Patent: Jun. 19, 2007

(54) ORGAN WALL ANALYSIS WITH RAY-CASTING

(75) Inventors: Romain Moreau-Gobard, Princeton, NJ (US); James P. Williams, Princeton Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 248 days.

(21) Appl. No.: 10/978,655

(22) Filed: Nov. 1, 2004

(65) Prior Publication Data

US 2005/0099416 A1 May 12, 2005

Related U.S. Application Data

(60) Provisional application No. 60/516,952, filed on Nov. 3, 2003.

(51) Int. Cl.
*G06T 17/00* (2006.01)
(52) U.S. Cl. .................................. 345/424; 382/128
(58) Field of Classification Search ................ 345/424; 382/128
See application file for complete search history.

(56) References Cited

OTHER PUBLICATIONS

Lavi, Mapping the coronary arteries on a sphere, Oct. 2, 2005.*

Etienne et al., "Soap-Bubble" Visualization and Quantitative analysis of 3D Coronary Magnetic Resonance Angiograms, 2002, pp. 658-666.*

\* cited by examiner

*Primary Examiner*—Almis R. Jankus
(74) *Attorney, Agent, or Firm*—Donald B. Paschburg; F. Chau & Associates, LLC (57) ABSTRACT

A system and corresponding method for organ wall analysis are provided, the system including a processor, an imaging adapter in signal communication with the processor for receiving organ scan data indicative of an organ, a distance mapping unit in signal communication with the processor for providing a three-dimensional distance map of a segmented outer surface of an organ, and a ray-casting unit in signal communication with the processor for providing a maximum intensity projection substantially normal to the segmented outer surface for each of a plurality of rays, and for forming a ray collection by casting each of the plurality of rays from a center of the organ through the respective maximum intensity projection to the segmented outer surface; and the corresponding method including providing a three-dimensional distance map of a segmented outer surface of an organ, providing a maximum intensity projection substantially normal to the segmented outer surface for each of a plurality of rays, and forming a ray collection by casting each of the plurality of rays from a center of the organ through the respective MIP to the segmented outer surface.

20 Claims, 9 Drawing Sheets

ORGAN WALL ANALYSIS WITH RAY-CASTING

CROSS-REFERENCE TO RELATED APPLICATION

This application claims the benefit of U.S. Provisional Application Ser. No. 60/516,952, filed Nov. 3, 2003 and entitled "3D Heart Wall Analysis Using a Ray Casting Technique", which is incorporated herein by reference in its entirety.

BACKGROUND

Medical image scanning data, for example, is typically obtained in the form of slices in various types of imaging modalities. These slices are then stacked to form a three-dimensional (3D) volume.

In the case of cardiovascular applications, a measurement of heart wall thickness may be necessary in order to detect damage to the heart muscle. Conventional tools have been used to acquire heart wall measurements, but they have the disadvantages of requiring user interaction and/or being based on two-dimensional (2D) slice-by-slice contouring techniques. It is desirable for many cardiovascular applications to have an automatic, more accurate and robust technique for analysis of a heart wall, particularly while in motion.

Accordingly, what is needed is an improved system and method for organ wall analysis. The present disclosure addresses these and other issues.

SUMMARY

These and other drawbacks and disadvantages of the prior art are addressed by a system and method for organ wall analysis with ray-casting.

A system of organ wall analysis with ray-casting includes a processor, an imaging adapter in signal communication with the processor for receiving organ scan data indicative of an organ, a distance mapping unit in signal communication with the processor for providing a three-dimensional distance map of a segmented outer surface of an organ, and a ray-casting unit in signal communication with the processor for providing a maximum intensity projection substantially normal to the segmented outer surface for each of a plurality of rays, and for forming a ray collection by casting each of the plurality of rays from a center of the organ through the respective maximum intensity projection to the segmented outer surface.

A corresponding method for organ wall analysis with ray-casting includes providing a three-dimensional distance map of a segmented outer surface of an organ, providing a maximum intensity projection substantially normal to the segmented outer surface for each of a plurality of rays, and forming a ray collection by casting each of the plurality of rays from a center of the organ through the respective MIP to the segmented outer surface.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for organ wall analysis with ray-casting in accordance with the following exemplary figures, in which.

DETAILED DESCRIPTION OF PREFERRED EMBODIMENTS

In accordance with preferred embodiments of the present disclosure, a system and method are provided for organ wall analysis with ray-casting. An exemplary method embodiment uses a ray-casting technique to measure the thickness of a heart wall at a precise location on the surface of the heart. After finding the exact location on the heart's surface, rays are cast from the center of the heart to the surface, always substantially perpendicular to the surface itself. A maximum intensity projection (MIP) may be computed for the rays. The resulting "normal-MIP" rendering features all rays substantially perpendicular or normal to the general surface of the heart.

A profile curve, which indicates the intensities of the voxels along a ray, is computed and a filter is used to extract the exact location of the heart wall from the profile. The thickness of the wall may be calculated and mapped to a color map. The colorized voxel is then projected on the heart's surface in three dimensions. The preferred method does not require user interaction, and is designed to process three-dimensional (3D) and four-dimensional (4D) data with high precision. Preferred embodiments provide a geometric constraint and a detection filter for the heart wall location.

Figure 1:
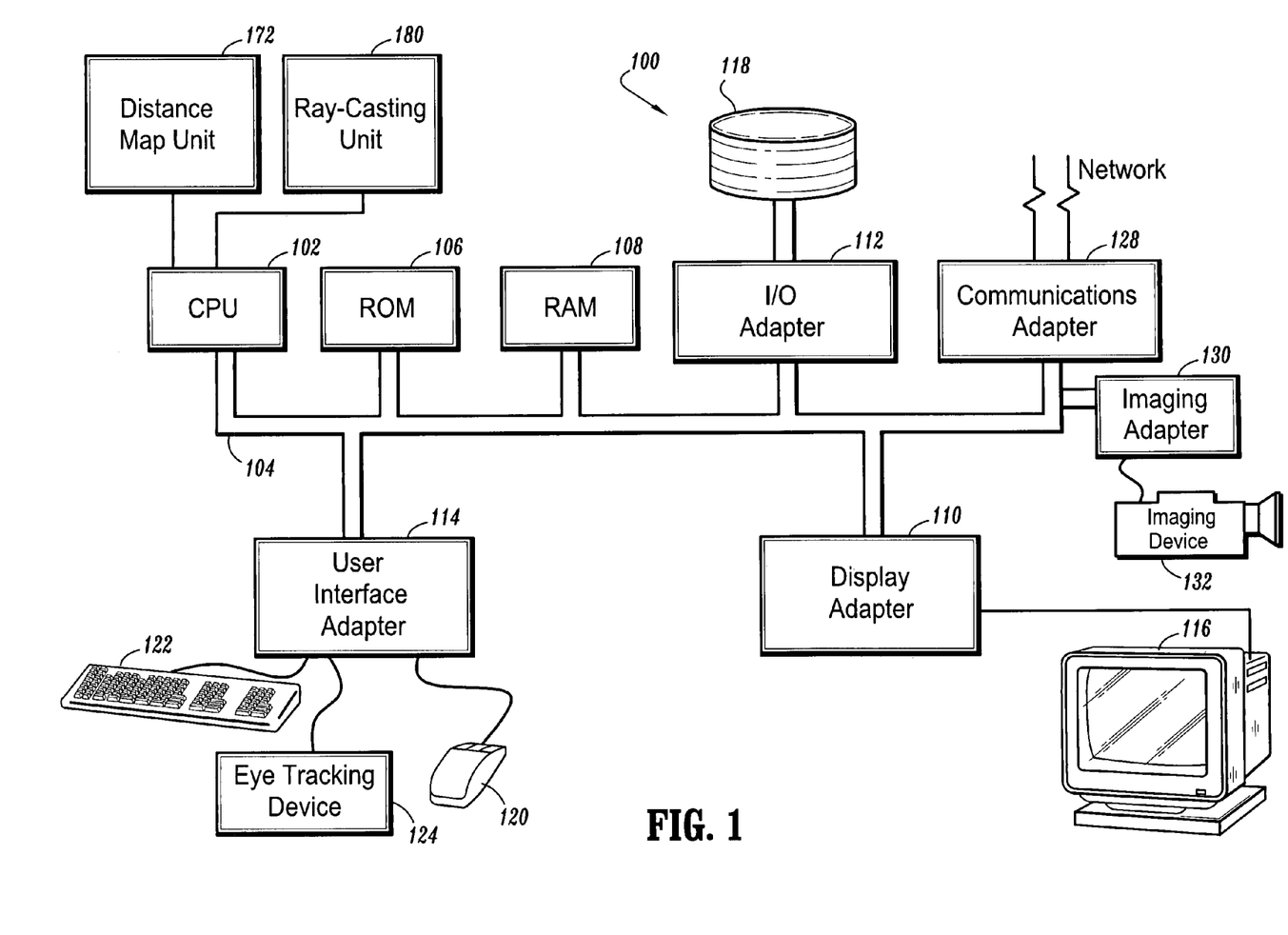
FIG. 1 shows a schematic diagram of a system for organ wall analysis with ray-casting in accordance with an illustrative embodiment of the present disclosure.

As shown in FIG. 1, a system for organ wall analysis with ray-casting according to an illustrative embodiment of the present disclosure is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. A magnetic resonance imaging device 132 is in signal communication with the system bus 104 via the imaging adapter 130.

A 3D distance mapping unit 172 and a ray-casting unit 180 are also included in the system 100 and in signal communication with the CPU 102 and the system bus 104. While the 3D distance mapping unit 172 and the ray casting unit 180 are illustrated as coupled to the at least one processor or CPU 102, these components are preferably embodied in computer program code stored in at least one of the memories 106, 108 and 118, wherein the computer program code is executed by the CPU 102. As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the 3D distance mapping unit 172 and the ray casting unit 180, as well as the other elements of the system 100, while practicing within the scope and spirit of the present disclosure.

Figure 2:
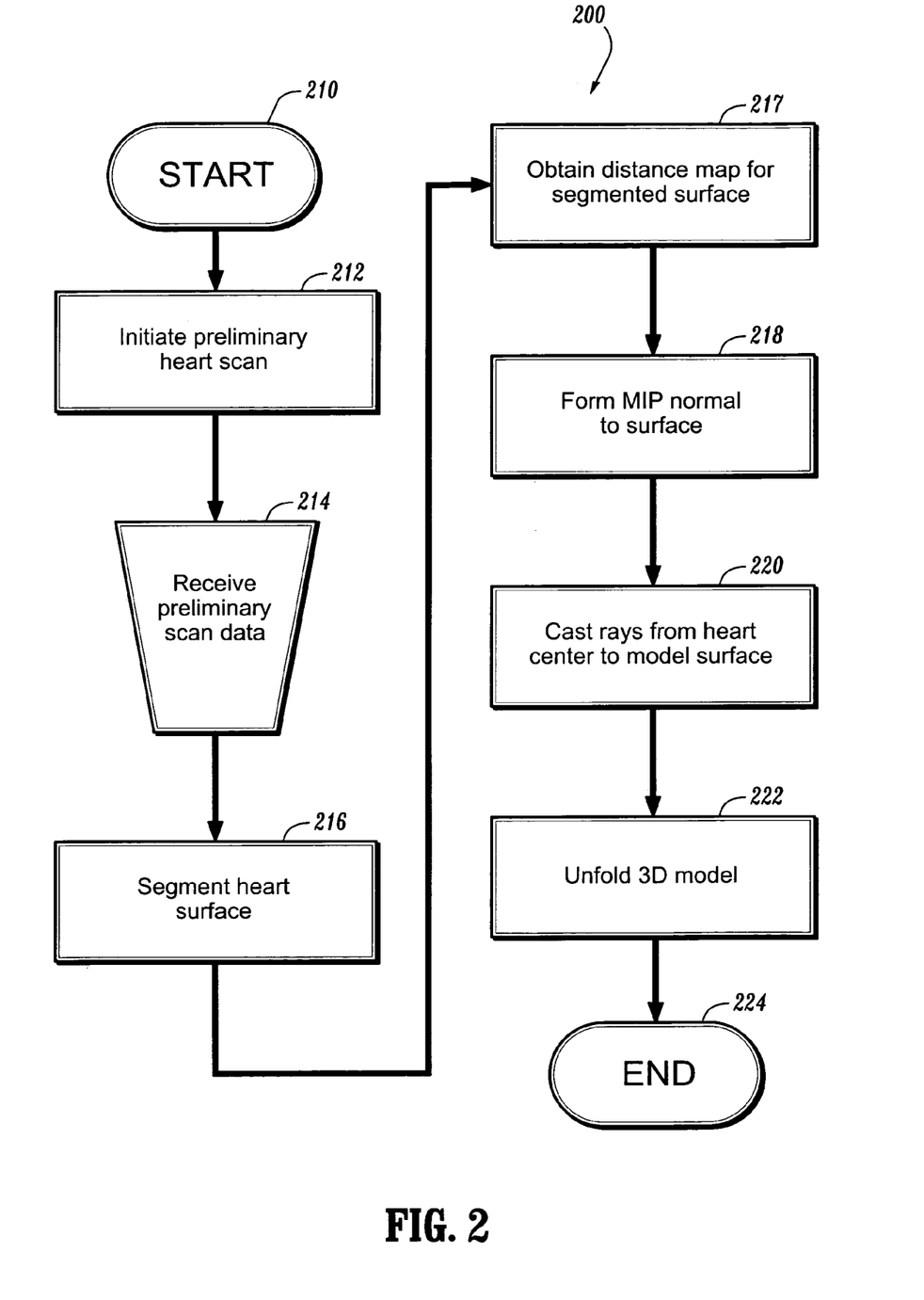
FIG. 2 shows a flow diagram of a method for organ wall analysis with ray-casting in accordance with an illustrative embodiment of the present disclosure.

Turning to FIG. 2, a flowchart for organ wall analysis with ray-casting according to an illustrative embodiment of the present disclosure is indicated generally by the reference numeral 200. The flowchart 200 includes a start block 210 that passes control to a function block 212. The function block 212 initiates a preliminary heart scanning session and passes control to an input block 214. The input block 214 receives preliminary heart scan data and passes control to a function block 216.

The function block 216 segments the heart's outer surface and passes control to a function block 217. The function block 217, in turn, provides a 3D distance map of a segmented outer surface of the heart, and passes control to a function block 218. The function block 218 performs a maximum intensity projection (MIP) substantially normal to the segmented outer surface for a number of rays, and passes control to a function block 220. The function block 220 forms a ray collection by casting each of the rays from a center of the organ through the respective MIP to the segmented outer surface, and passes control to a function block 222. The function block 222 unfolds the 3D model and passes control to an end block 224.

Figure 3:
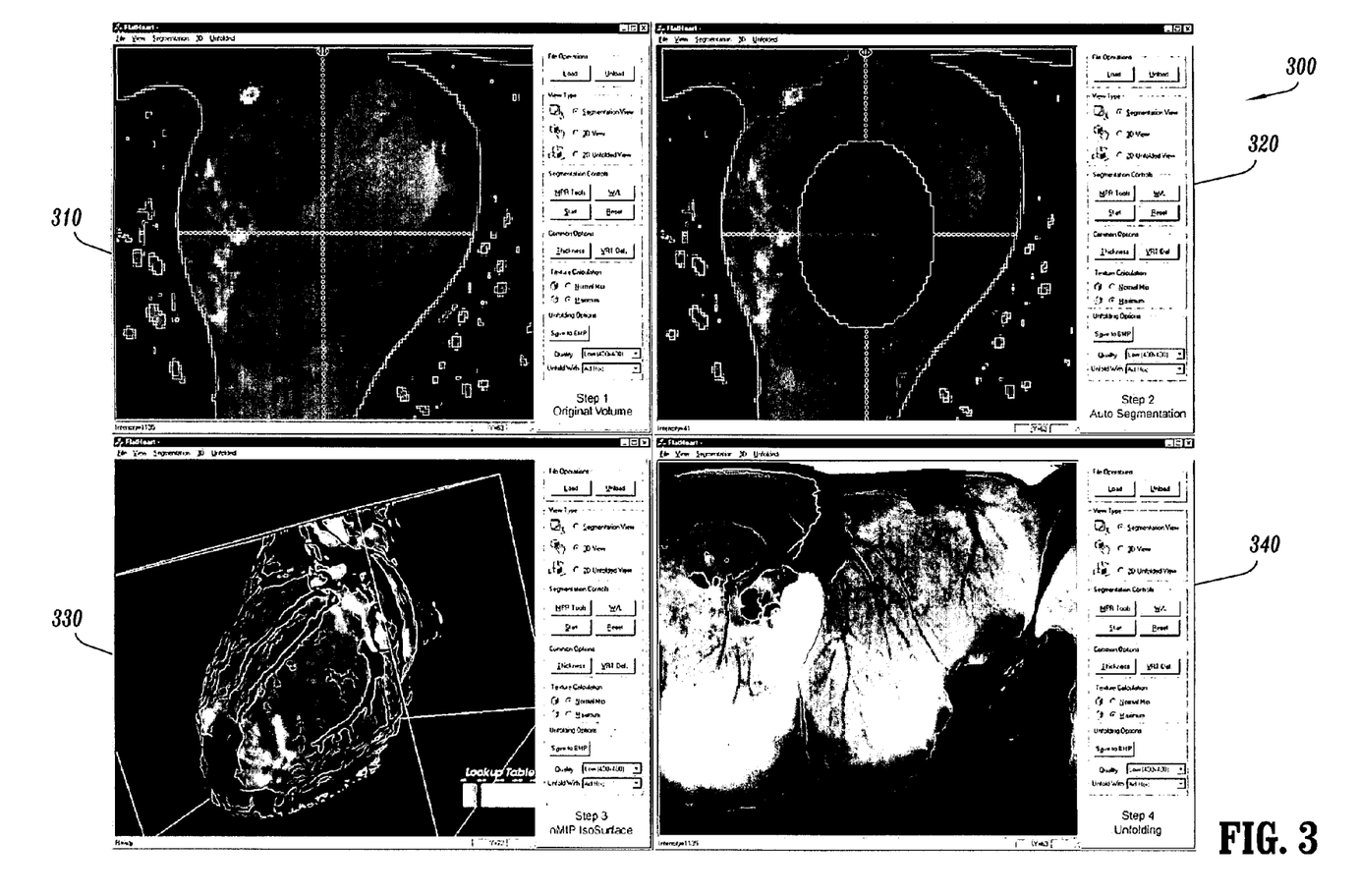
FIG. 3 shows a screen diagram of program steps in accordance with an illustrative embodiment of the present disclosure.

Turning now to FIG. 3, program demonstration steps are indicated generally by the reference numeral 300. The steps include an original volume step 310, an automatic segmentation step 320, a normal-MIP isosurface step 330 and an unfolding step 340.

Figure 4:
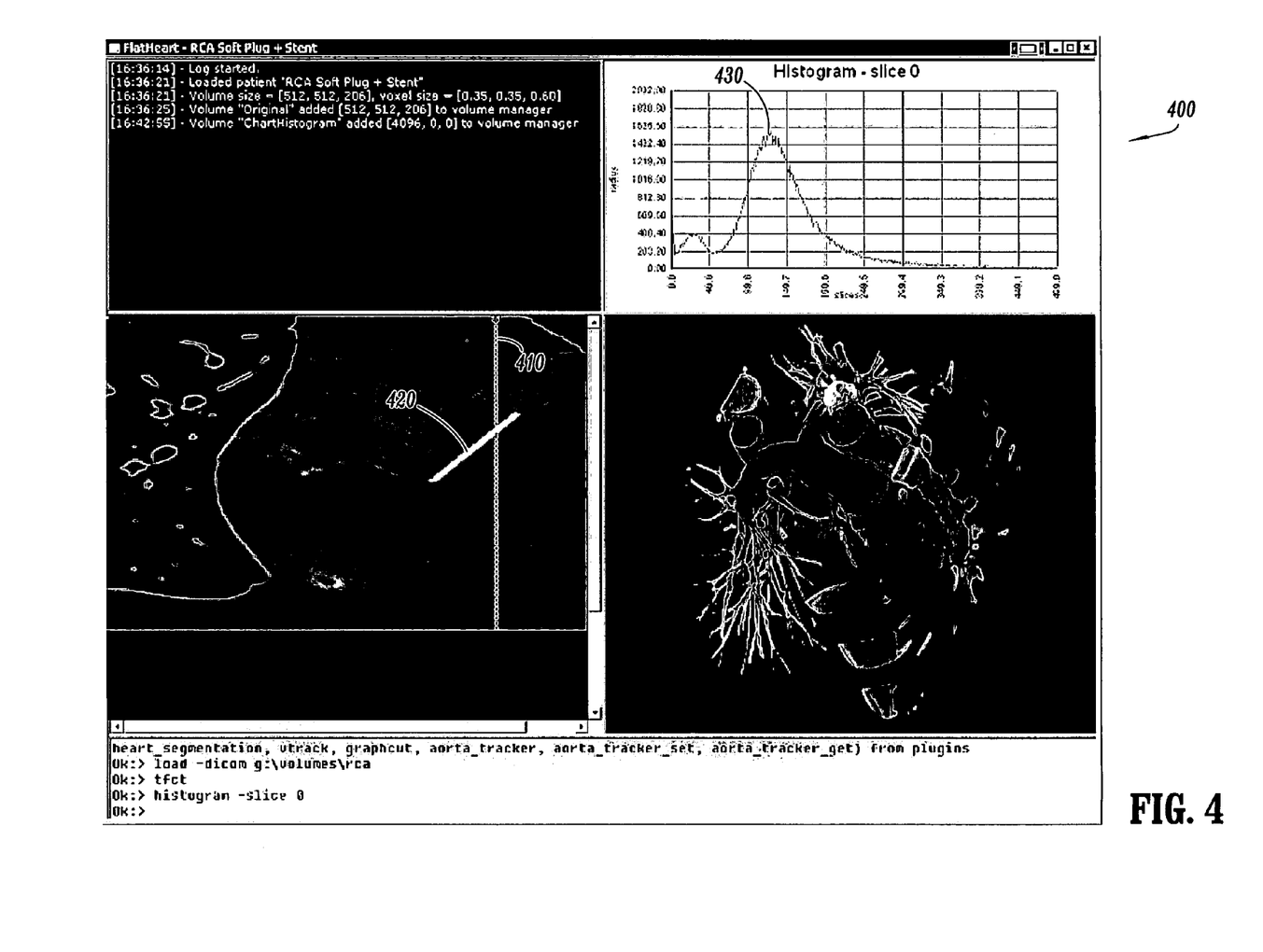
FIG. 4 shows a graphical diagram of a slice histogram in accordance with an illustrative embodiment of the present disclosure.

As shown in FIG. 4, a slice radius histogram is indicated generally by the reference numeral 400. The histogram 400 is for the ray 410, which crosses the stent 420. The plot 430 indicates a peak for the stent 420.

Figure 5:
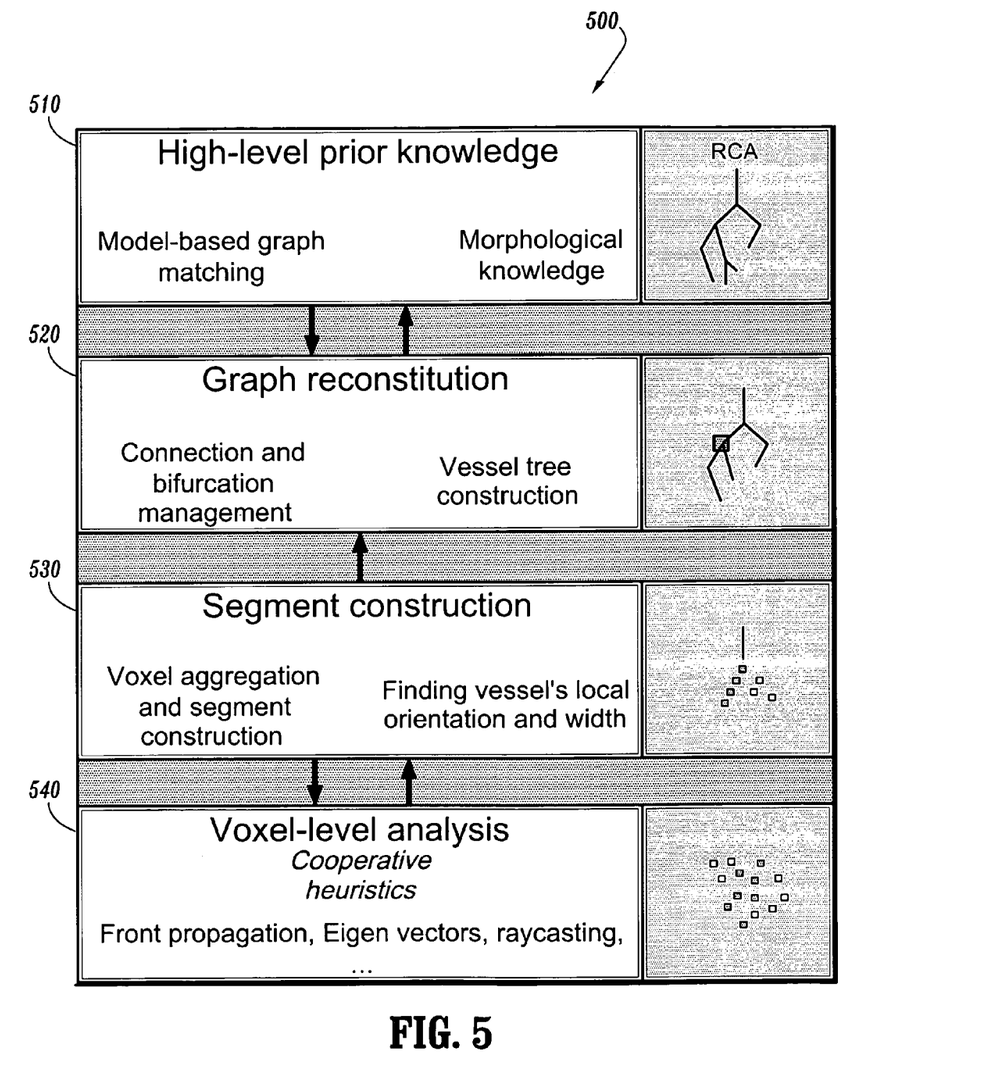
FIG. 5 shows a schematic diagram of a system in accordance with an illustrative embodiment of the present disclosure.

Turning to FIG. 5, a system is indicated generally by the reference numeral 500. The system 500 includes a high-level prior knowledge unit in bi-directional signal communication with a graph reconstruction unit 520, which, in turn, is in receivable signal communication with a segment construction unit 530. The segment construction unit 530 is in bi-directional signal communication with a voxel-level analysis unit 540.

The high-level prior knowledge unit 510 provides model-based graph matching, and morphological knowledge. The graph reconstruction unit 520 provides connection and bifurcation management, and vessel tree construction. The segment construction unit 530 provides voxel aggregation and segment construction, and finds vessel local orientation and width. For its part, the voxel-level analysis unit 540 provides cooperative heuristics, front propagation, eigenvectors, ray-casting and the like.

Figure 6:
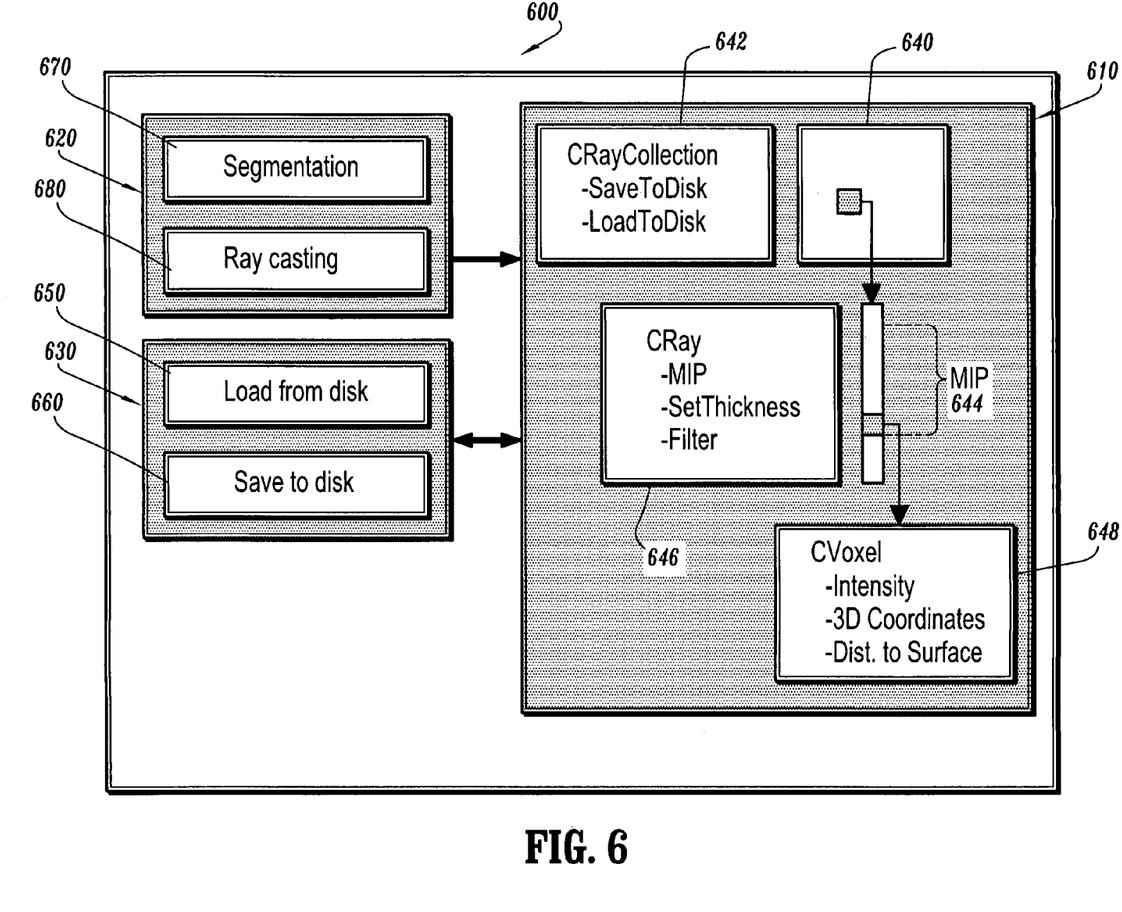
FIG. 6 shows a schematic diagram for building a ray collection in accordance with an illustrative embodiment of the present disclosure.

Turning now to FIG. 6, a ray collection unit is indicated generally by the reference numeral 600. The ray collection unit 600 includes a ray handling unit 610, a segmentation/casting unit 620 and a disk input/output unit 630. The ray handling unit 610 includes a ray collection portion 640, a ray collection control portion 642, a maximum intensity projection (MIP) portion 644, a ray control portion 646, and a voxel portion 648. The segmentation/casting unit 620 includes a segmentation unit 670 and a ray casting unit 680, while the disk input/output unit 630 includes a loading unit 650 and a saving unit 660. The ray collection unit builds a ray collection by creating a data structure containing the voxels for each ray. The data structure, in turn, is used for fast interaction, such as changing the MIP thickness, as well as for further vessel detection. In this exemplary internal data structure, the current ray collection 640 could contain 400×400×40 elements, for example.

Figure 7:
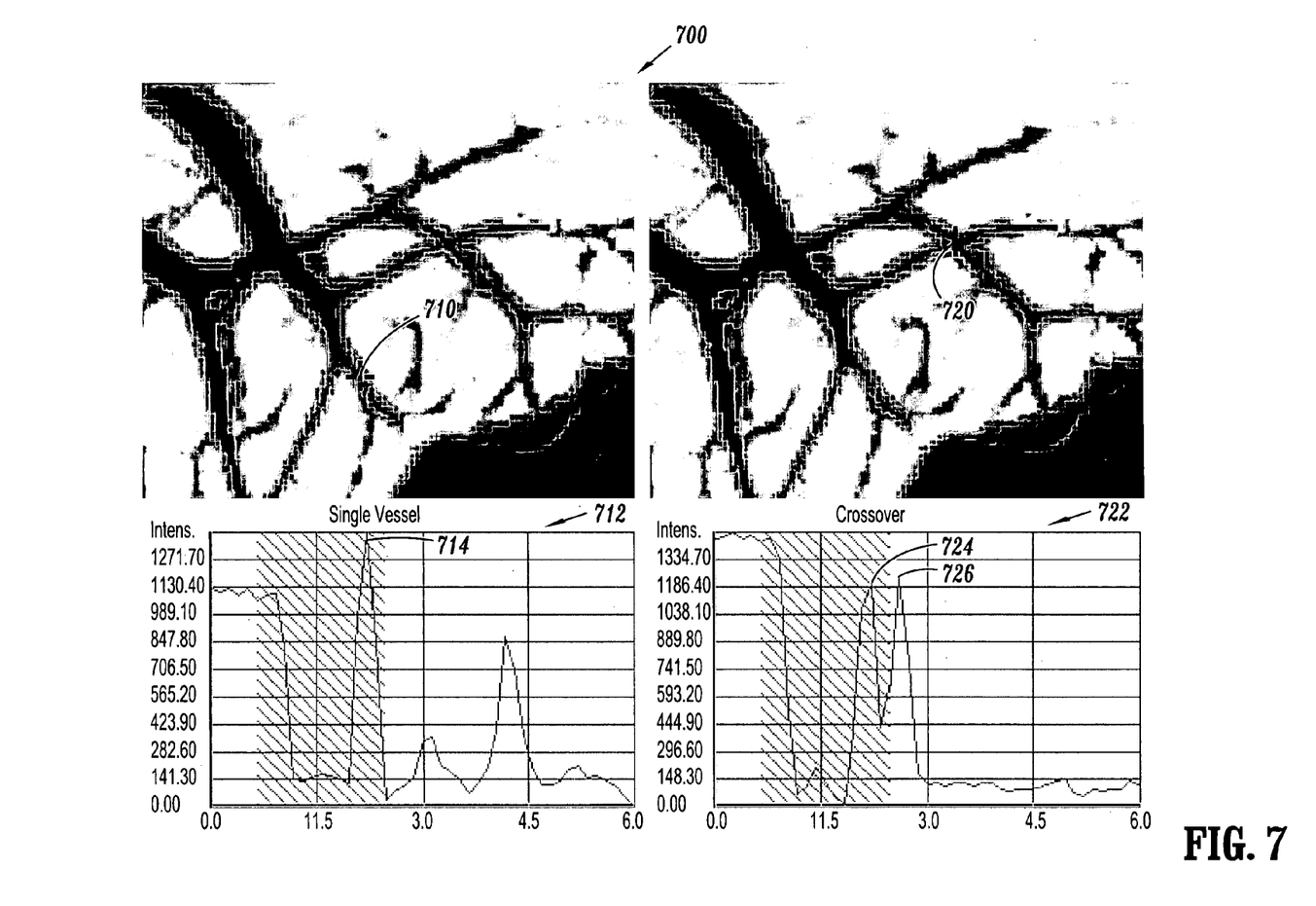
FIG. 7 shows a graphical diagram for analyzing a ray collection in accordance with an illustrative embodiment of the present disclosure.

As shown in FIG. 7, a ray collection analysis is indicated generally by the reference numeral 700. The analysis 700 includes a single vessel 710 and a crossover 720. A profile curve 712 for the single vessel 710 shows a single intensity peak 714, while a profile curve 722 for the crossover 720 shows dual intensity peaks 724 and 726 for first and second vessels, respectively. The ray collection is filtered by analyzing the profile curve for each ray, and looking for known patterns. The exact 3D locations are known for each voxel on the profile curves, which also allows the user to interact with the 3D model.

Figure 8:
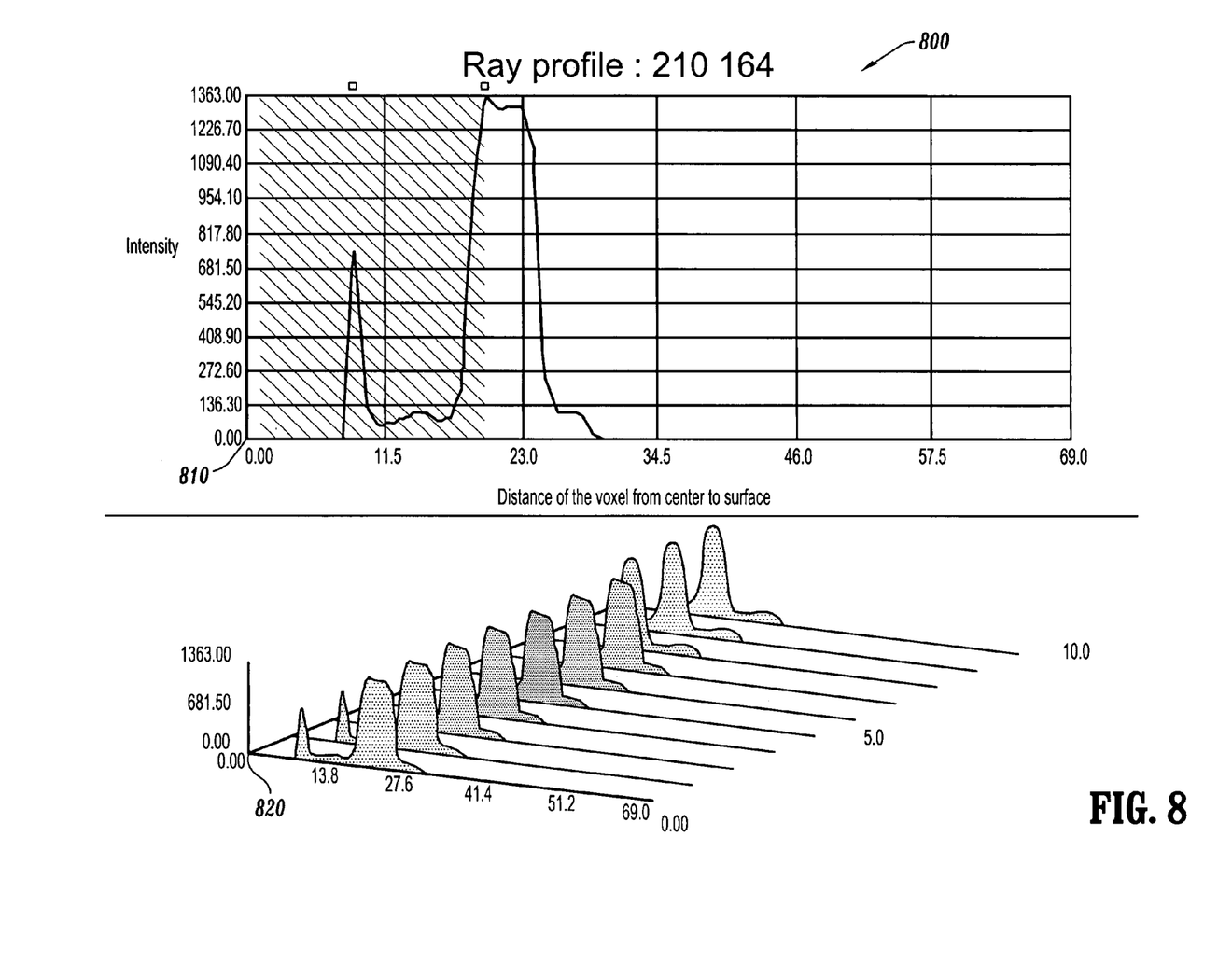
FIG. 8 shows a graphical diagram for filtering a ray collection in accordance with an illustrative embodiment of the present disclosure.

Turning to FIG. 8, a ray collection filtering is indicated generally by the reference numeral 800. The filtering 800 includes a ray profile 810 and a vessel tracking plot 820. Rays are filtered by finding the local maximum on each ray and analyzing the slopes and intensites to obtain a first set of points. 3D point clouds of the filtered points are provided.

Figure 9:
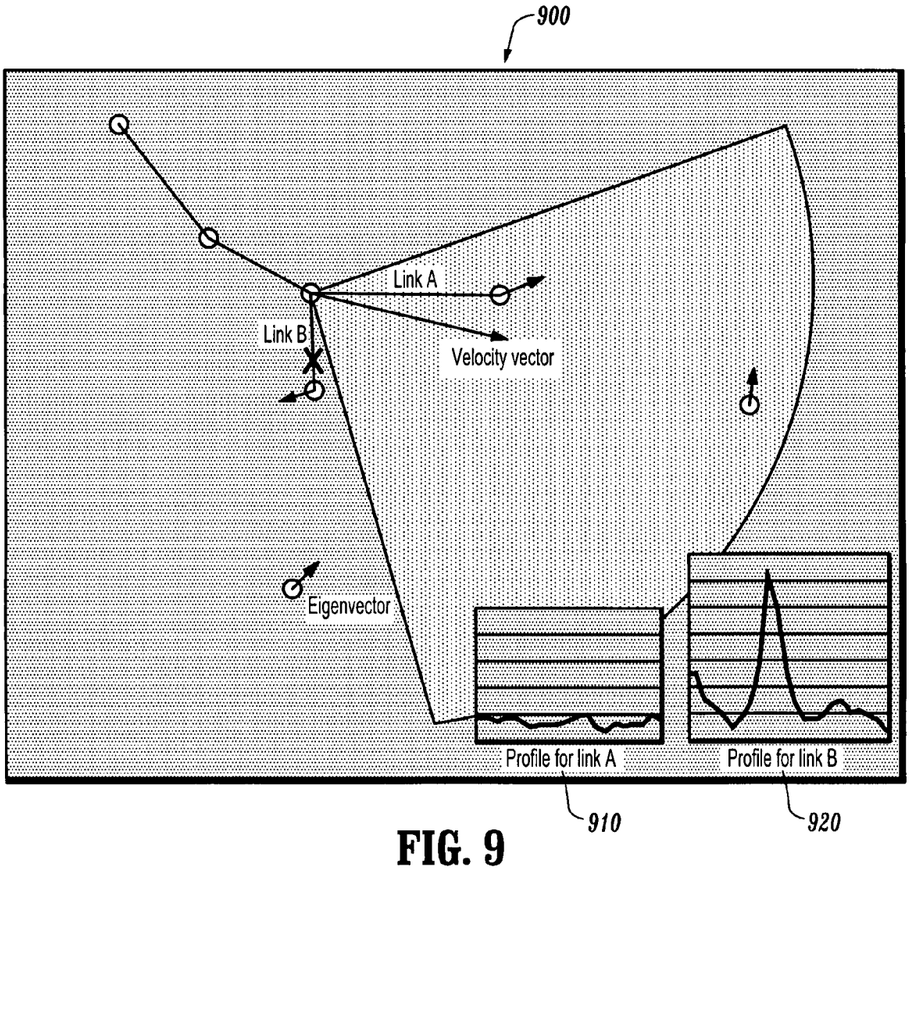
FIG. 9 shows a graphical diagram of link profiles in accordance with an illustrative embodiment of the present disclosure.

Turning now to FIG. 9, a link plot is indicated generally by the reference numeral 900. The link plot 900 includes a Link A and a Link B. A profile 910 for the Link A indicates no significant peaks. On the other hand, a profile 920 for the Link B does indicate a significant peak.

Embodiments of the present disclosure provide for automatic heart isolation, including heart unfolding and valve detection. Heart coronary artery segmentation and enhancement are also provided. Model-based segmentation and coronary segmentation are available as well.

In one embodiment, 3D heart extraction and surface visualization automatically crops the 3D volume for better visualization and diagnosis. A valve detection approach uses one seed point in the aorta, and computes the location of the aortic valve with its associated angle. Segmentation of the full coronary tree from the aorta with one click anywhere in the aorta is also provided.

Automatic heart isolation is the first step in preferred embodiment 3D post-processing cardiac applications to permit application of 3D MIP. In an exemplary embodiment, an automatic cropping algorithm takes 15 seconds for a 512×512×256 voxel volume. Automatic cropping may also be applied to 4D volumes.

Heart unfolding provides the whole coronary tree in one 2D image using surface MIP, where no user interaction is needed. Real-time MIP thickness adjustment is used, with 2D/3D picking. Such embodiments can measure directly on the 2D map, and examples take just 15 seconds for a 512×512×256 voxel volume.

In operation of the method 200 of FIG. 2, an exemplary embodiment uses the following technique for isolation of the surface of the heart. In order to compute a normal MIP, the heart's surface is identified and then a 3D distance map is built. A 3D graph cut algorithm, as known to those of ordinary skill in the pertinent art, may be used to crop the heart data. The result of this isolation is to define a clear boundary between the myocardium and the rest of the volume.

The segmentation algorithm outputs a 3D mask, which will be converted to a 3D distance map in the next step. Note that the quality of the final image does not depend on the result of the segmentation itself at some degree, which makes this technique highly robust. In addition, other methods can be used in the step to isolate the heart, such as model-based segmentation, for example.

Referring back to FIG. 3, one-click aortic valve detection is also provided. Here, model-based segmentation allows detection of the location of the valve in less than two seconds using the exemplary RCA Patient with a volume of 512×512×206 voxels.

Referring back to FIG. 4, a log is started, the patient "RCA Soft Plug+Stent" is loaded having a volume size of 512× 512×206 voxels with a voxel size of 0.35×0.35×0.60 millimeters. Next, the volume "Original" having a volume size of 512×512×206 voxels is added to the volume manager or local database. For display, the volume "ChartHistogram" is also added to the volume manager.

Heart isolation embodiments of the present disclosure include 3D vessel viewers and 4D viewers. A library embodiment has been evaluated. Model-based segmentation to extract the branching points of the left coronary artery (LCA) and right coronary artery (RCA) is implemented, as is extraction of the left circumflex artery (LCX). A segmentation algorithm is used for the lower parts of the vessels.

In operation of an exemplary embodiment, a heart surface segmentation is performed. This includes identifying the heart's surface and building a 3D distance map. A 3D graph cut algorithm, as known in the art, is used to crop the surface of the heart. A feature of this isolation is to define a clear boundary between the myocardium and rest of the volume.

The segmentation algorithm outputs a 3D mask, which will be converted to a 3D distance map in the next step. Note that the quality of the final image does not depend on the result of the segmentation itself at some degree, which makes this technique quite robust. As will be recognized by those of ordinary skill in the pertinent art based on the teachings herein, there are alternate methods that can be used to isolate the heart, such as a model-based segmentation or different segmentation algorithms.

Once the distance map is obtained, ray-casting is performed for each voxel of the heart's surface. Each ray is defined by the vector perpendicular to the surface and a predefined range inside and outside the surface. Each ray can be represented as a profile curve defined by the intensity of each voxel on the ray between two points, one before and the other after the heart's wall, for example.

Extraction of the exact heart wall location is possible from each profile curve. This is done by applying a filter on the 2D profile. The thickness of the wall at this position is computed and projected to the surface through a color-map, such as from thin indicated by blue to thick indicated by red.

In operation of another exemplary embodiment, a three-dimensional (3D) isolation is obtained from an unfolded view by segmenting the heart surface, and casting rays from the center to the surface. A ray collection is built by creating a structure containing the voxels for each ray. The structure may be used for fast interaction, such as changing the MIP thickness, and for further vessel detection. The ray collection is analyzed by analyzing the profile curve for each ray and looking for known patterns, where the exact 3D location is known for each voxel on the profile curve. The rays are filtered by obtaining the local maximum on each ray and analyzing the slopes and intensities to provide a first set of points. Concurrent points are adjusted and processed to better approximate the centerlines of the vessels, eliminate noise, and increase coherence between points on the same vessel. Points are adjusted in 3D with eigenvalues to help center the points and eliminate some of the noise.

The focus becomes increasing the density of points along the vessel in order to make the linking easier. A continuity filter is implemented for each point with a set of heuristics to create other points that are on the same vessel. The heuristics may include minimal distance between existing points, ridge detection, and/or a velocity vector of the previous points. One-click vessel detection is accomplished by linking all points with a similar direction in the same neighborhood from one seed point.

As will be recognized by those of ordinary skill in the pertinent art, alternate embodiments may detect two-dimensional (2D) centerlines of coronaries, separate arteries from veins, evaluate plaques for an unfolded view, detect calcium in an unfolded view, and/or separate pulmonary vessels.

This exemplary method brings an improved visualization technique for the heart coronaries, as well as vessels on the surface of the heart. One feature is to "unfold" the surface of the heart and create a MIP of this unfolded surface. The resulting 2D map of the surface of the heart contains highly contrasted vessels.

Thus, the exemplary technique used for unfolding the surface of the heart is accomplished in four steps: 1) Segmentation of the heart's outer surface; 2) Fixed 3D model parameterization of the heart; 3) Casting rays from the center of the heart to the surface of the 3D model, for which an MIP filter can be applied; and 4) Unfolding of the 3D model.

A graph cut algorithm as known in the art, for example, may be used to segment the outer surface of the heart. From the result of this segmentation, a distance map is created to evaluate the distance from each point on the volume to the segmented surface of the heart. Then, a known 3D model can be fit into the heart so that the surface of the heart fits the surface of the model. After this step, a ray is cast from the center of the heart to the surface of the 3D model. A profile curve is created while the ray propagates through the heart, and a response filter is applied to detect the eventual location of a vessel. If a location is found, then the algorithm displays the result on the surface of the 3D Model. As will be recognized by those of ordinary skill in the pertinent art, the unfolding of the 3D model is a widely studied problem and several different algorithms can be used.

A preferred embodiment uses a sphere as 3D model and maximum intensity projection (MIP) as the profile curve filter. Although alternate 3D models and ray filters may be used, some may adversely impact the quality of the results.

Thus, preferred embodiments of the present disclosure provide powerful heart unfolding tools for coronary isolation and visualization, enabling users to extract significant features and regions-of-interest. Preferred embodiments can serve as very useful acquisition-time modeling and automated post-processing tools in clinical applications.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method of organ wall analysis comprising:
   providing a three-dimensional (3D) distance map of a segmented outer surface of an organ;
   providing a maximum intensity projection (MIP) substantially normal to the segmented outer surface for each of a plurality of rays; and
   forming a ray collection by casting each of the plurality of rays from a center of the organ through the respective MIP to the segmented outer surface.

2. A method as defined in claim 1 wherein:
   the organ is a beating heart; and
   the substantially normal MIPs are indicative of features comprising coronary valves.

3. A method as defined in claim 1, further comprising:
   segmenting the outer surface of the organ; and
   providing a 3D mask precursor to the 3D distance map.

4. A method as defined in claim 1, further comprising unfolding a 3D model of the organ into a two-dimensional (2D) image in correspondence with the substantially normal MIPs.

5. A method as defined in claim 1, further comprising:
   providing a profile for each ray;
   filtering each profile to extract an exact organ wall location; and
   computing the thickness of the wall at each location.

6. A method as defined in claim 2 wherein the 3D model is selected from the group of 3D shapes consisting of a sphere, a cylinder and an ellipsoid.

7. A method as defined in claim 1 wherein user interaction is not required.

8. An apparatus for organ wall analysis comprising:
   distance mapping means for providing a three-dimensional (3D) distance map of a segmented outer surface of an organ;
   projecting means for providing a maximum intensity projection (MIP) substantially normal to the segmented outer surface for each of a plurality of rays; and
   collecting means for forming a ray collection by casting each of the plurality of rays from a center of the organ through the respective MIP to the segmented outer surface.

9. An apparatus as defined in claim 8, further comprising scanning means for receiving organ scan data.

10. An apparatus as defined in claim 8, further comprising display means for displaying organ scan data.

11. A system for organ wall analysis, comprising:
    a processor;
    an imaging adapter in signal communication with the processor for receiving organ scan data indicative of an organ;
    a distance mapping unit in signal communication with the processor for providing a three-dimensional (3D) distance map of a segmented outer surface of an organ; and
    a ray-casting unit in signal communication with the processor for providing a maximum intensity projection (MIP) substantially normal to the segmented outer surface for each of a plurality of rays, and for forming a ray collection by casting each of the plurality of rays from a center of the organ through the respective MIP to the segmented outer surface.

12. A system as defined in claim 11 wherein the processor renders the organ scan data as a 3D image about a region of interest.

13. A system as defined in claim 12, further comprising a display adapter in signal communication with the processor for displaying the rendered 3D image.

14. A system as defined in claim 13, further comprising a user interface adapter for checking the scan quality.

15. A system as defined in claim 11 wherein the processor provides a profile for each ray and recognizes known patterns.

16. A program storage device readable by machine, tangibly embodying a program of instructions executable by the machine to perform program steps for organ wall analysis, the program steps comprising:
    providing a three-dimensional (3D) distance map of a segmented outer surface of an organ;
    providing a maximum intensity projection (MIP) substantially normal to the segmented outer surface for each of a plurality of rays; and
    forming a ray collection by casting each of the plurality of rays from a center of the organ through the respective MIP to the segmented outer surface.

17. A device as defined in claim 16 wherein:
    the organ is a beating heart; and
    the substantially normal MIPs are indicative of features comprising coronary valves.

18. A device as defined in claim 16, the program steps further comprising unfolding a 3D model of the organ into a two-dimensional (2D) image in correspondence with the substantially normal MIPs.

19. A device as defined in claim 16, the program steps further comprising:
  providing a profile for each ray;
  filtering each profile to extract an exact organ wall location; and
  computing the thickness of the wall at each location.

20. A device as defined in claim 16, the program steps further comprising:
  segmenting the outer surface of the organ; and
  providing a 3D mask precursor to the 3D distance map.

* * * * *